United States Patent
Vik et al.

(10) Patent No.: US 10,406,727 B2
(45) Date of Patent: Sep. 10, 2019

(54) SYSTEM AND METHOD FOR PROCESSING ELASTOMERIC LOAD RINGS OF FACE SEALS TO PROVIDE IMPROVED LOAD TOLERANCE

(71) Applicant: CNH Industrial America, LLC, New Holland, PA (US)

(72) Inventors: Brian Vik, Barnesville, MN (US); Robert Kost, Moorhead, MN (US)

(73) Assignee: CNH Industrial America LLC, New Holland, PA (US)

( * ) Notice: Subject to any disclaimer, the term of this patent is extended or adjusted under 35 U.S.C. 154(b) by 413 days.

(21) Appl. No.: 15/142,006

(22) Filed: Apr. 29, 2016

(65) Prior Publication Data
US 2017/0312946 A1 Nov. 2, 2017

(51) Int. Cl.
*B29C 43/00* (2006.01)
*B29C 43/36* (2006.01)
(Continued)

(52) U.S. Cl.
CPC ............ *B29C 43/003* (2013.01); *B29C 43/36* (2013.01); *B29C 43/52* (2013.01); *F16J 15/328* (2013.01); *F16J 15/344* (2013.01); *B29K 2021/00* (2013.01); *B29K 2995/0082* (2013.01); *B29L 2031/26* (2013.01)

(58) Field of Classification Search
CPC ........ B29C 43/003; B29C 43/36; B29C 43/52
See application file for complete search history.

(56) References Cited

U.S. PATENT DOCUMENTS 3,392,984 A * 7/1968 Reinsma ............ B62D 55/0887
277/380
3,910,587 A   10/1975 Loeffler et al.
(Continued)

FOREIGN PATENT DOCUMENTS

| EP | 2469134 | 6/2012 |
| WO | WO 93/13342 | 12/1992 |

OTHER PUBLICATIONS

Sessink, et al. Design of Elastomer O-ring Vacuum Seals HTTP:// dialog.proquest.com ( Unable to provide—Log in required).
(Continued)

*Primary Examiner* — Jacob T Minskey
*Assistant Examiner* — Melody Tsui
(74) *Attorney, Agent, or Firm* — Rickard K. DeMille; Rebecca L. Henkel

(57) ABSTRACT

A system for processing elastomeric load rings may include an elastomeric load ring defining an initial width. The system may also include a fixture assembly configured to receive the load ring between first and second clamp members. The second clamp member may be spaced apart from the first clamp member such that a gap is defined between the clamp members when the load ring defines the initial width. The fixture assembly may also include a load member configured to apply a compressive load through the first clamp member and/or the second clamp member such that the load ring is compressed between the clamp members. When the load ring is heated, a spring force of the load ring may be reduced as the load ring is compressed between the clamp members such that the initial width of the load ring is reduced to a final width.

20 Claims, 12 Drawing Sheets

(51) Int. Cl.
  *B29C 43/52*   (2006.01)
  *F16J 15/328*  (2016.01)
  *F16J 15/34*   (2006.01)
  *B29K 21/00*  (2006.01)
  *B29L 31/26*  (2006.01)

(56) References Cited

U.S. PATENT DOCUMENTS

| | | | |
|---|---|---|---|
| 4,406,462 A * | 9/1983 | Witten | F16J 15/3464 |
| | | | 277/348 |
| 5,183,271 A | 2/1993 | Wada et al. | |
| 5,346,662 A | 9/1994 | Black et al. | |
| 5,669,612 A | 9/1997 | Nicholson | |
| 5,971,399 A | 10/1999 | Hashimoto et al. | |
| 6,224,065 B1 * | 5/2001 | Smith | F16J 15/125 |
| | | | 277/611 |
| 6,322,087 B1 | 11/2001 | Swensen et al. | |
| 6,764,110 B2 | 7/2004 | Russell | |
| 7,455,050 B2 | 11/2008 | Xu | |
| 7,517,486 B2 | 4/2009 | Gottlieb et al. | |
| 7,790,094 B2 | 9/2010 | Lim et al. | |
| 8,186,685 B2 | 5/2012 | Martin et al. | |
| 8,636,286 B2 | 1/2014 | Vik | |
| 8,727,387 B2 | 5/2014 | Knapp | |
| 9,120,261 B2 | 9/2015 | Hench et al. | |
| 2010/0308579 A1 | 12/2010 | Snyder et al. | |

OTHER PUBLICATIONS

Patent Cooperative Treaty (PCT) PCT/US2017/027361 International Search Report dated Jun. 22, 2017 (11 pages).

* cited by examiner

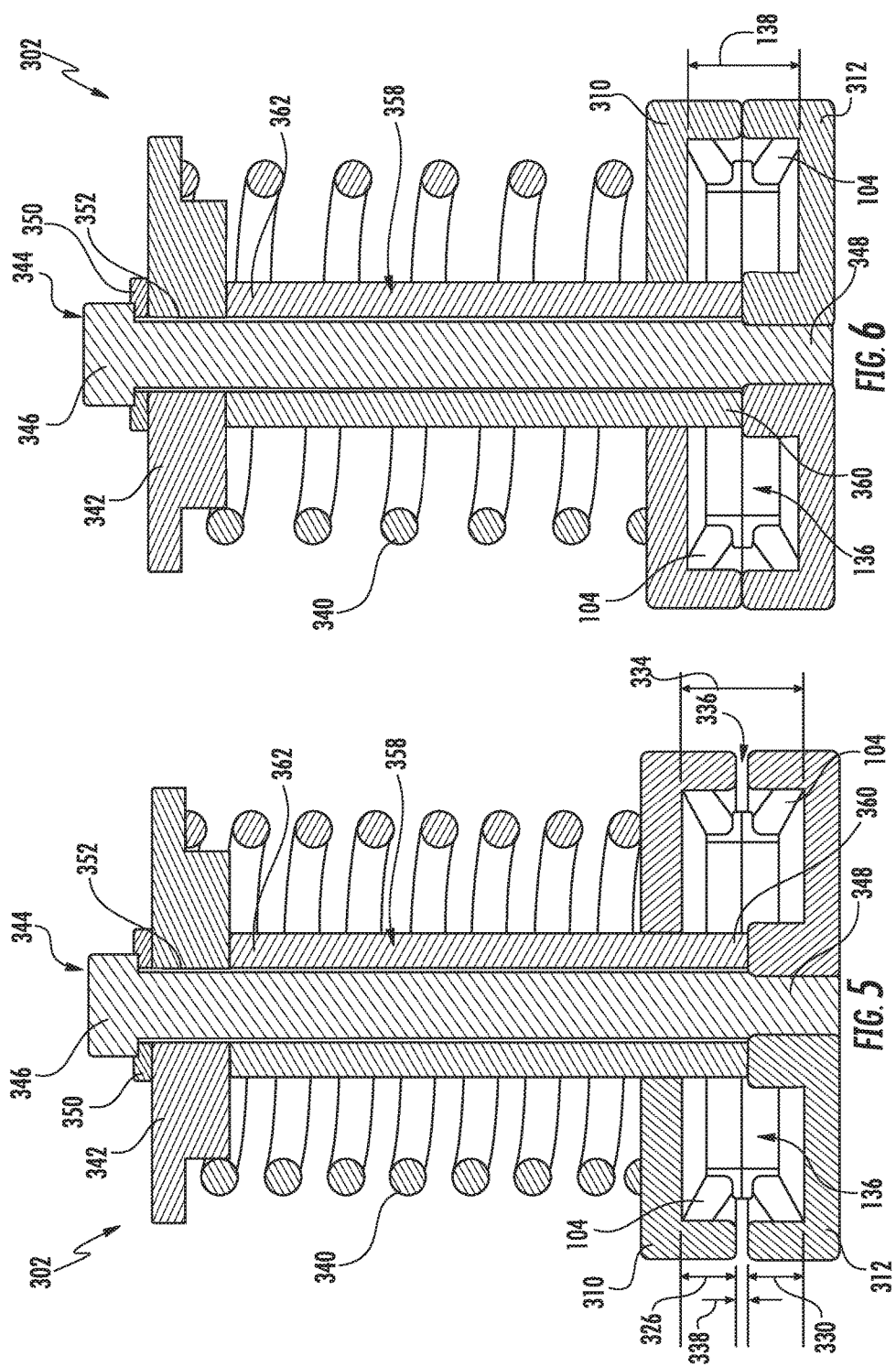

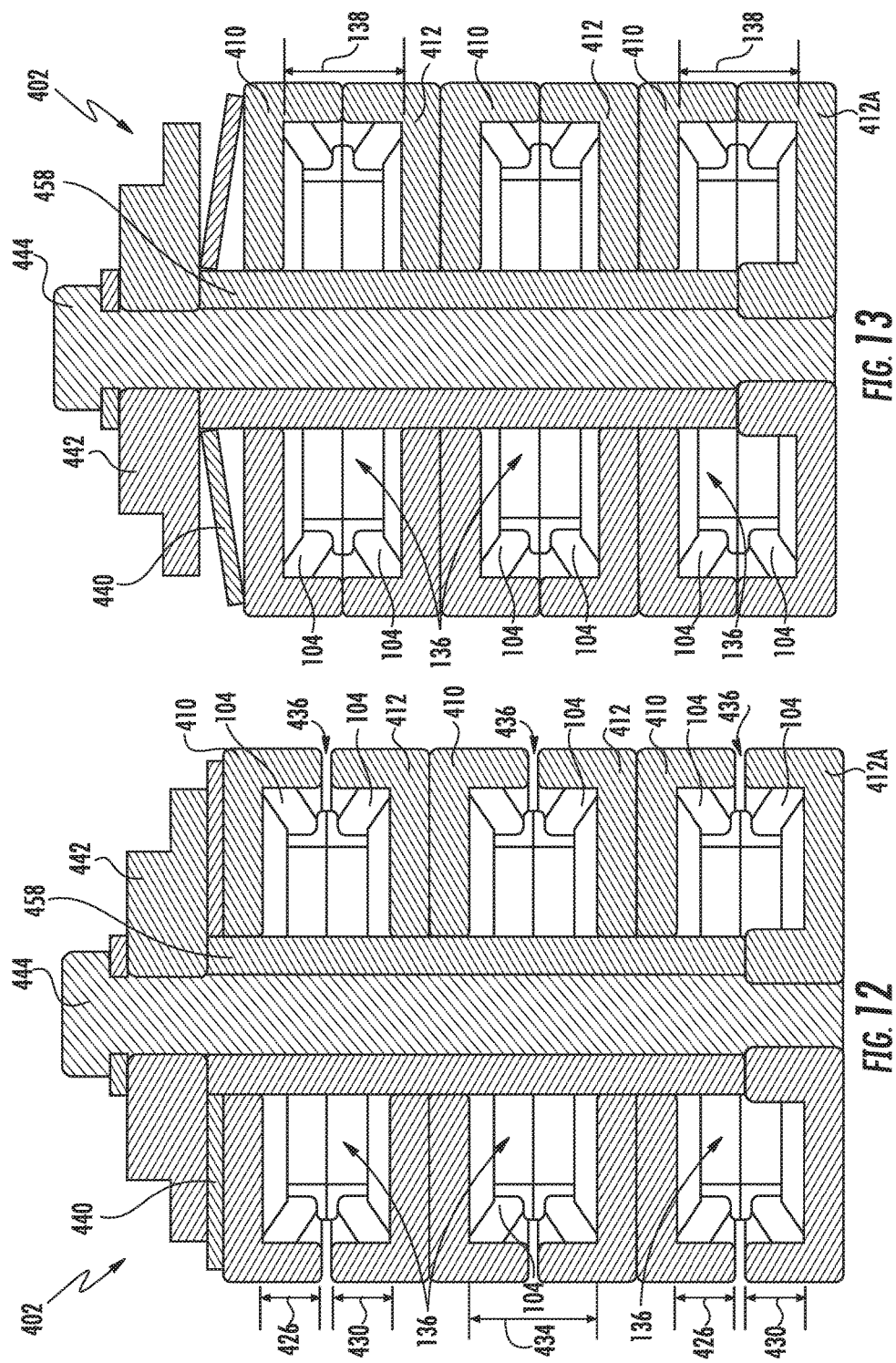

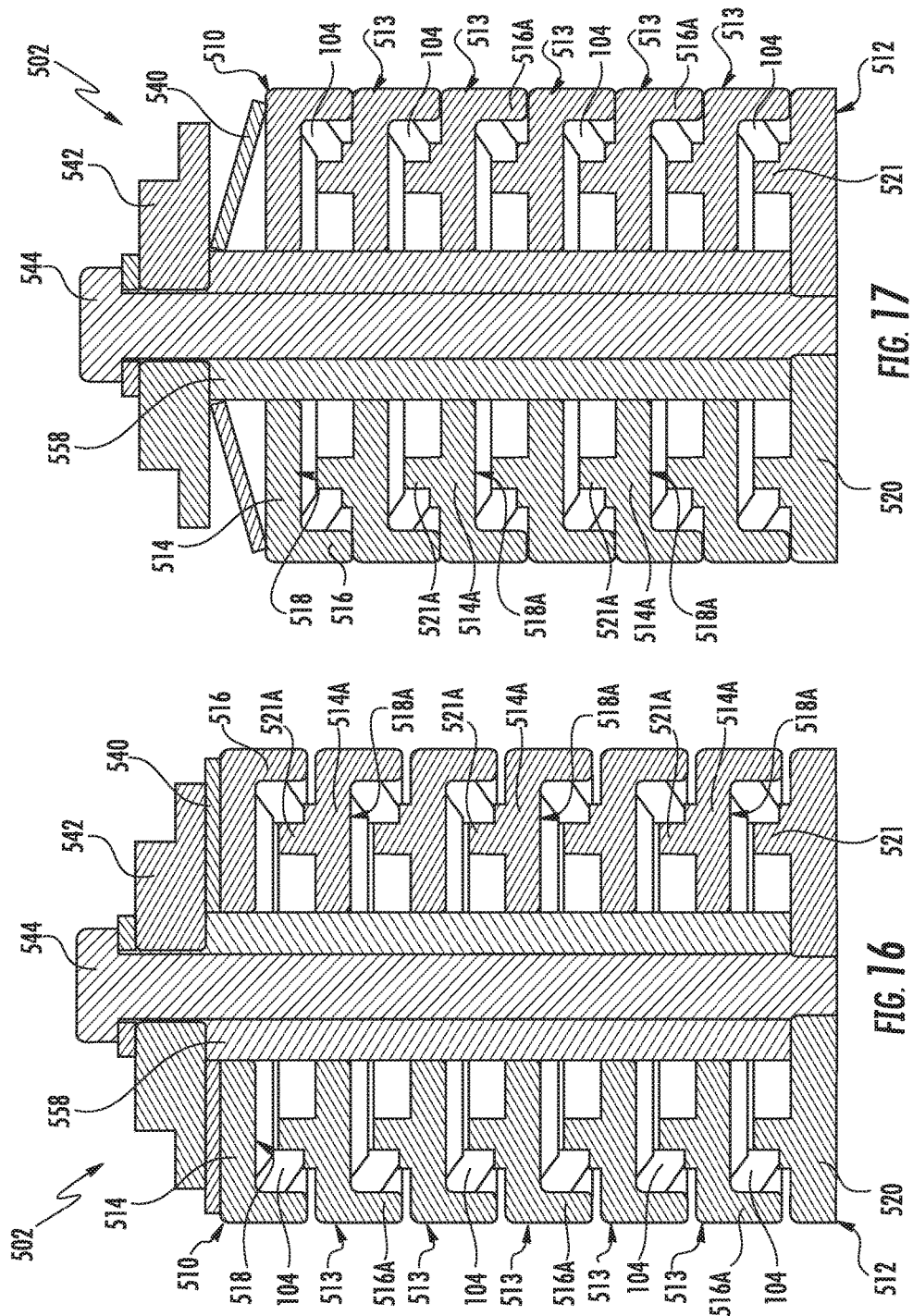

SYSTEM AND METHOD FOR PROCESSING ELASTOMERIC LOAD RINGS OF FACE SEALS TO PROVIDE IMPROVED LOAD TOLERANCE

FIELD OF THE INVENTION

The present subject matter relates generally to face seals and, more particularly, to a system and method for processing an elastomeric load ring of a face seal to provide improved load tolerance for the face seal.

BACKGROUND OF THE INVENTION

Axial face seals (or "face seals") are used to seal two relatively rotating bodies against each other. Face seals keep dirt and other contamination from reaching sensitive parts of a machine, such as bearings, and are also used to retain fluid within a fluid-filled housing. Typically, face seals are designed to be mounted and assembled as pairs in a face-to-face relationship to form a face seal set, with the two sealing rings (typically highly polished metal rings) facing each other and rotating relative to one another. Each face seal also includes an elastomeric load ring extending around the outer perimeter of its sealing ring.

In many instances, face seals may be used with rubber-tracked vehicles having high travel speeds, which, in turn, produce high face seal temperatures due to the high circumferential face speeds. As is generally understood, the sealing capability of a face seal is limited by the heat generated between the adjacent sealing faces of the assembled face seal set. The amount of heat generated between the sealing faces is generally a function of the face speed and the face load for the face seal. While the face speed is typically known or can be easily determined, the face load for a face seal can vary significantly due to current manufacturing tolerances. For instance, due to variations in the elastomeric load rings (e.g., in the material properties), the current industry standard for tolerance on the face load for a face seal is +/−30% of the nominal face load. Due to the high variability in the face load, current face seals must be designed to perform properly when the face load is 30% less than nominal, and still not overheat when the face load is 30% higher than nominal. This often results in face seals being overdesigned to accommodate the load variability, which is inefficient and uneconomical.

Accordingly, a system and method for processing an elastomeric load ring of a face seal that reduces the load variability of the resulting face seal would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for processing elastomeric load rings of face seals. The system may generally include an elastomeric load ring configured for use with a face seal. The elastomeric load ring may define an initial width. Additionally, the system may include a fixture assembly configured to receive the elastomeric load ring. The fixture assembly may include a first clamp member and a second clamp member positioned relative to the first clamp member such that the elastomeric load ring is positioned between the first and second clamp members. The second clamp member may be spaced apart from the first clamp member such that a gap is defined between the first and second clamp members when the elastomeric load ring defines the initial width. The fixture assembly may also include a load member configured to apply a compressive load through at least one of the first clamp member or the second clamp member such that the elastomeric load ring is compressed between the first and second clamp members. When the elastomeric load ring is heated, a spring force associated with the elastomeric load ring may be reduced as the elastomeric load ring is compressed between the first and second clamp members such that the initial width of the elastomeric load ring is reduced to a final width. Moreover, the first clamp member may contact the second clamp member when the elastomeric load ring defines the final width.

In another aspect, the present subject matter is directed to a method for processing an elastomeric load ring configured for use with a face seal, wherein the elastomeric load ring defines an initial width. The method may include installing the elastomeric load ring between first and second clamp members of a fixture assembly, wherein the second clamp member is spaced apart from the first clamp member such that a gap is defined between the first and second clamp members when the elastomeric load ring defines the initial width. In addition, the method may include applying a compressive load through at least one of the first clamp member or the second clamp member such that the elastomeric load ring is compressed between the first and second clamp members and heating the elastomeric load ring to reduce a spring force associated with the elastomeric load ring as the elastomeric load ring is compressed between the first and second clamp members such that the initial width of the elastomeric load ring is reduced to a final width. Moreover, the first clamp member may contact the second clamp member when the elastomeric load ring defines the final width.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates a cross-sectional view of one embodiment of a fixture assembly suitable for use within the system shown in FIG. 4, particularly illustrating the fixture assembly in an initial state prior to heating of the elastomeric load rings contained within the fixture assembly;

FIG. 6 illustrates another cross-sectional view of the fixture assembly shown in FIG. 5, particularly illustrating the fixture assembly in a final state after heating is completed to produce the compression set in the load rings contained within the fixture assembly;

FIG. 12 illustrates a cross-sectional view of further embodiment of a fixture assembly suitable for use within the system shown in FIG. 4, particularly illustrating the fixture assembly in an initial state prior to heating of the elastomeric load rings contained within the fixture assembly;

FIG. 13 illustrates another cross-sectional view of the fixture assembly shown in FIG. 12, particularly illustrating the fixture assembly in a final state after heating is completed to produce the compression set in the load rings contained within the fixture assembly;

FIG. 16 illustrates a cross-sectional view of an even further embodiment of a fixture assembly suitable for use within the system shown in FIG. 4, particularly illustrating the fixture assembly in an initial state prior to heating of the elastomeric load rings contained within the fixture assembly;

FIG. 17 illustrates another cross-sectional view of the fixture assembly shown in FIG. 16, particularly illustrating the fixture assembly in a final state after heating is completed to produce the compression set in the load rings contained within the fixture assembly.

DETAILED DESCRIPTION OF THE INVENTION

Figure 1:
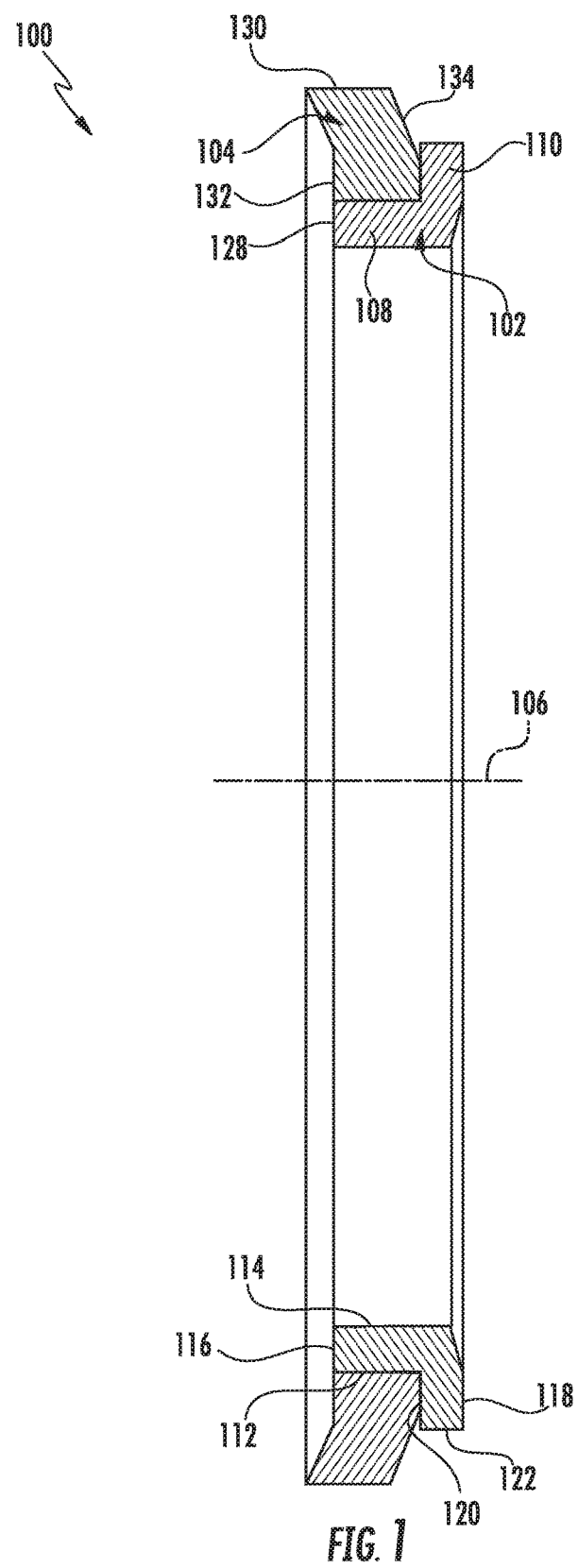
FIG. 1 illustrates a cross-sectional view of one embodiment of a face seal in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for processing elastomeric load rings of face seals to provide improved load tolerance. Specifically, in several embodiments, the disclosed system and method may allow for a post-cure process to be performed that reduces the load tolerance of a face seal by applying heat and force to an elastomeric load ring of the face seal in a controlled manner to induce compression set in the load ring. As will be described below, the process may be controlled so that, when the desired load is achieved, further compression of the elastomeric load ring is stopped. Thus, elastomeric load rings may be produced that provide the desired spring force to the sealing rings of a face seal set with a reduced tolerance range for the face load as compared to traditional manufacturing processes.

As will be described below, the post-cure process may be implemented by constraining an elastomeric load ring(s) within a fixture assembly as the load ring(s) is being heated to a desired temperature. Specifically, in several embodiments, the elastomeric load ring(s) may be inserted between first and second clamp members of the fixture assembly such that the inner and outer diameters of the load ring(s) are constrained within the fixture assembly. In addition, the fixture assembly may include a load member configured to apply a desired load to the elastomeric load ring(s). For instance, the load member may correspond to a spring configured to apply a compressive load to the first clamp member and/or second clamp member that allows the elastomeric load ring(s) to be compressed between the clamp members.

Additionally, after installation of the elastomeric load ring(s) within the fixture assembly, the entire assemblage may be heated to produce compression set in the elastomeric material of the load ring(s). For instance, in one embodiment, the fixture assembly containing the elastomeric load ring(s) may be placed within a curing oven. As the heat applied to the elastomeric load ring(s) results in compression set, the compressive load applied by the spring may result in the width(s) of the elastomeric load ring(s) being reduced to a desired width(s) for use within a corresponding face seal set. As will be described below, in several embodiments, the clamp members of the fixture assembly may be configured to contact one another when the width(s) of the elastomeric load ring(s) has been reduced to the desired width(s), thereby preventing further compression set of the load ring(s). As such, the fixture assembly may provide a controlled mechanical stop to set the final load/width of each elastomeric load ring.

Figure 2:
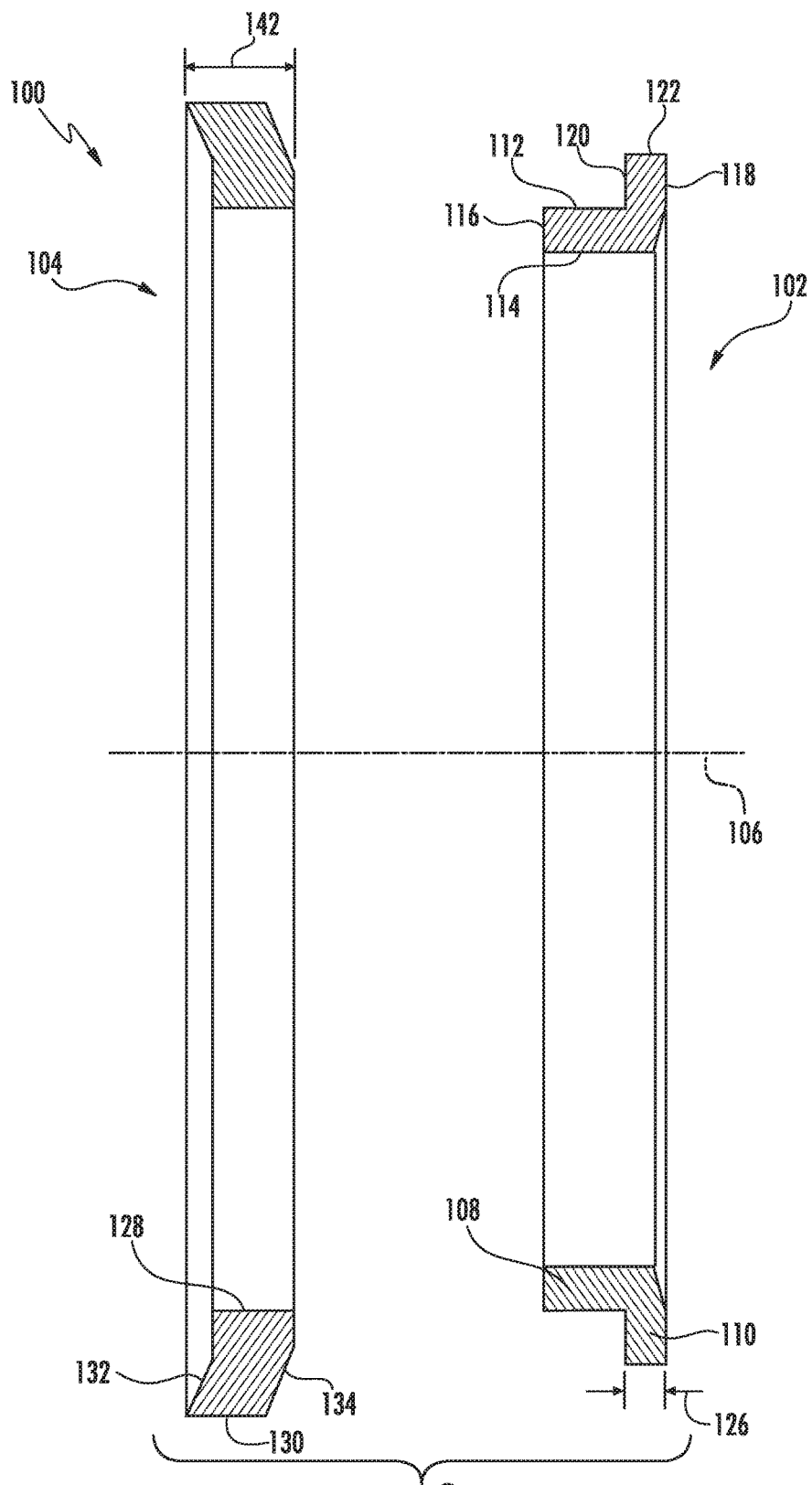
FIG. 2 illustrates a cross-sectional, exploded view of the components of the face seal shown in FIG. 1.
Figure 3:
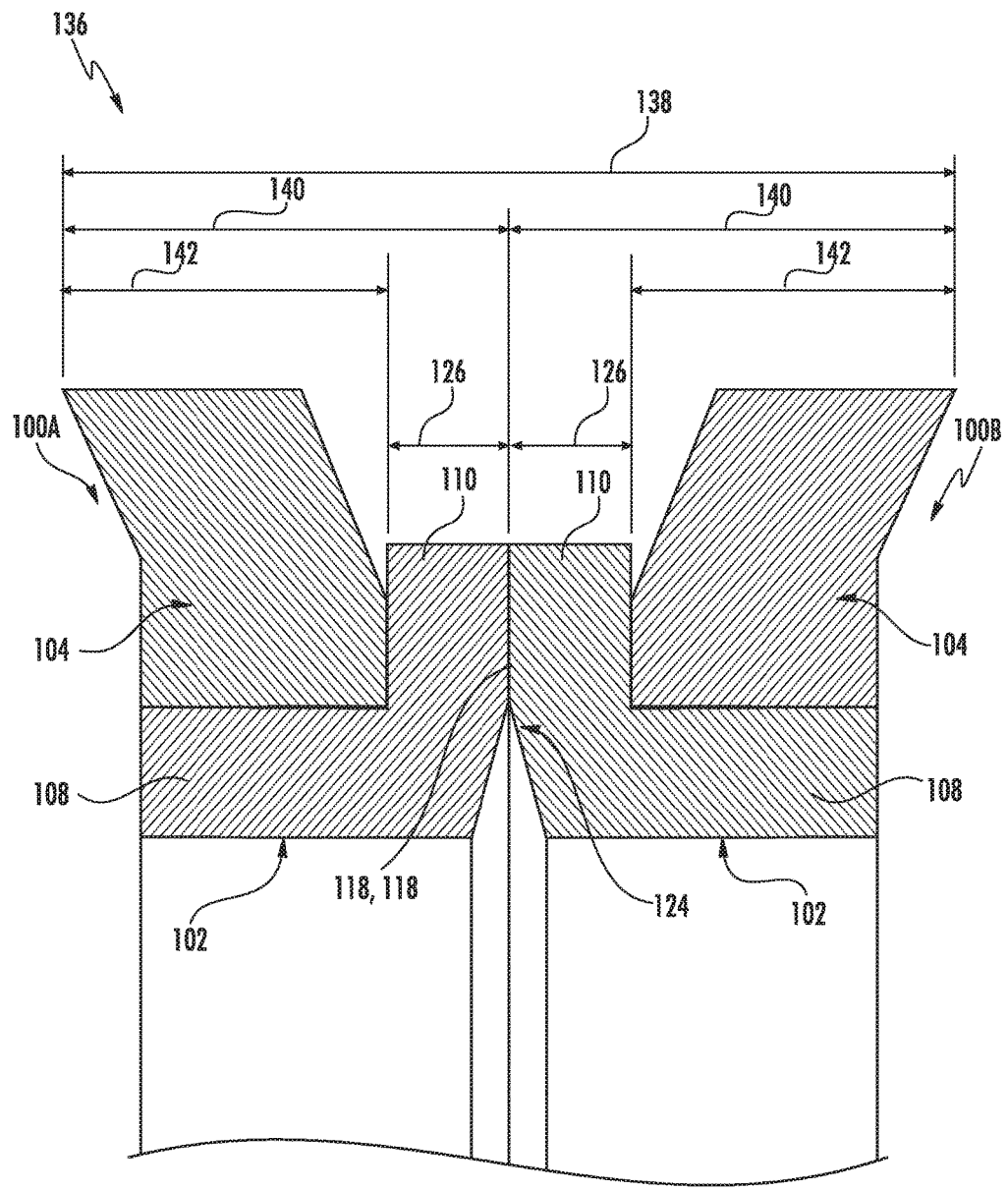
FIG. 3 illustrates a partial, cross-sectional view of two face seals identical to the face seal shown in FIG. 1, particularly illustrating the face seals provided in a face-to-face relationship relative to one another in accordance with aspects of the present subject matter.

Referring now to FIGS. 1-3, several views of one embodiment of a mechanical face seal(s) 100 are illustrated in accordance with aspects of the present subject matter. Specifically, FIG. 1 illustrates a cross-sectional view of the face seal 100 and FIG. 2 illustrates a cross-sectional, exploded view of the face seal 100 shown in FIG. 1. Additionally, FIG. 3 illustrates a partial, cross-sectional view of two face seals 100 (e.g., a first face seal 100A and a second face seal 100B)

positioned face-to-face relative to one another, with each face seal 100A, 100B having the same configuration as the face seal 100 shown in FIGS. 1 and 2.

As shown in the illustrated embodiment, the disclosed face seal 100 may generally include a metallic sealing ring 102 and an elastomeric load ring 104. In general, the sealing ring 102 may be positioned along the radially inner side of the face seal 100 (i.e., closest to a central axis 106 associated with the seal face 100). As shown in FIGS. 1 and 2, in several embodiments, the sealing ring 102 may include an inner cylindrical or body portion 108 extending axially generally parallel to the central axis 106 and a planar seal flange 110 extending radially generally perpendicular to the central axis 106. In such embodiments, the inner body portion 108 and the seal flange 110 of the sealing ring 102 may generally form an "L-shaped" cross-section.

As particularly shown in FIG. 2, the inner body portion 108 of the sealing ring 102 may include an outer cylindrical wall 112, an inner cylindrical wall 114 and a radial edge 116 extending between the outer and inner cylindrical walls 112, 114. In one embodiment, the outer cylindrical wall 112 may be spaced apart from the inner cylindrical wall 114 by a generally constant radial distance along the axial length of the inner body portion 108.

Additionally, as shown in FIG. 2, the seal flange 110 of the sealing ring 102 may correspond to a generally planar disk having a radially extending seal-side wall 118, a radially extending non-seal-side wall 120, and an outer cylindrical edge 122 extending axially between the opposed walls 118, 120, with a thickness 126 of the seal flange being defined between its opposed walls 118, 120. In one embodiment, the seal-side wall 118 may define a sealing surface that is configured to engage a corresponding mating surface of an adjacent face seal 100. For instance, such an arrangement is shown in FIG. 3, which illustrates a partial view of two identical face seals 100A, 100B provided in a face-to-face relationship relative to one another such that the seal-side wall 118 of each face seal 100A, 100B is positioned directly against or adjacent to the seal-side wall 118 of the adjacent face seal 100A, 100B. As such, a sealing interface 124 may be defined between the adjacent face seals 100A, 100B between their respective seal-side walls 118.

It should be appreciated that, in general, the seal-side wall 118 of the seal flange 110 may be substantially planar. However, when a pair of opposing face seals 100 is assembled relative to a wheel assembly, the seal-side wall 118 of each face seal 100 may be configured to deflect slightly in a known way to encourage the flow of lubricating oil in-between the two opposing seal-side walls 118.

Referring still to FIGS. 1-3, the elastomeric load ring 104 may generally be configured to be positioned around an outer perimeter of the inner body portion 108 of the sealing ring 102. As particularly shown in FIG. 2, the elastomeric load ring 104 may include an inner cylindrical wall 128, an outer cylindrical wall 130 and first and second sidewalls 132, 134 extending between the opposed cylindrical walls 128, 130. In general, the inner cylindrical wall 128 may be configured to be positioned against or adjacent to the outer cylindrical wall 112 of the sealing ring 102. In one embodiment, the inner cylindrical wall 128 may be retained against the outer cylindrical wall 112 of the sealing ring 102 via friction. Alternatively, the inner cylindrical wall 112 may be bonded or otherwise coupled to the outer cylindrical wall 112 of the sealing ring 102.

It should be appreciated that the elastomeric load ring 104 may generally be formed from any suitable material. In one embodiment, the composition of the elastomeric load ring 104 may be a polymer having high temperature resistance, which may allow for the disclosed face seal 100 to be advantageously used for high speed/temperature applications, such as within rubber-tracked undercarriages for a work vehicle. In a particular embodiment, the polymer used to form the elastomeric load ring 104 may be a fluoropolymer, preferably a fluoroelastomer, and more preferably a dipolymer or terpolymer of vinylidene fluoride and hexafluoropropylene, or vinylidene fluoride, hexafluoropropylene and tetrafluoroethylene.

It should also be appreciated that, when the face seal 100 is assembled in a face-to-face relationship with another face seal 100 (e.g., as shown in FIG. 3) to form a face seal set 136, the seal set 136 may generally define a predetermined operating width 138 corresponding to the maximum axial width defined between the axially outermost surfaces or edges of the elastomeric load rings 104, which may vary depending on the specific wheel assembly or other assembly within which the face seal set 136 is being utilized. As such, each face seal 100 may be configured to define a desired seal width 140 corresponding to one-half of the predetermined operating width 138 of the face seal set 126. For instance, as shown in FIG. 3, the desired seal width 140 of each face seal 100 may be defined between the seal-side wall 118 of each seal flange 110 and the axially outermost surface or edge of each elastomeric load ring 102. In such an embodiment, each elastomeric load ring 104 may similarly define an axial width 142 between its axially outermost surface or edge and the seal flange 110 of the adjacent sealing ring 102 that corresponds to the difference between the desired seal width 140 for the face seal 100 and the thickness 126 of the seal flange 110.

Additionally, it should be appreciated that, although the face seal(s) 100 illustrated in FIGS. 1-3 have been shown as having a given seal configuration, the present subject matter may generally be applicable to face seals have any suitable seal configuration. For example, as opposed to having a non-bonded ring design, the face seal(s) 100 may have a bonded ring design. An example of a face seal having a bonded ring design is described, for example, in U.S. Pat. No. 8,636,286 entitled "Press-fit Face Seal for use with Wheel Assembly," the disclosure of which is hereby incorporated by reference herein in its entirety for all purposes.

Figure 4:
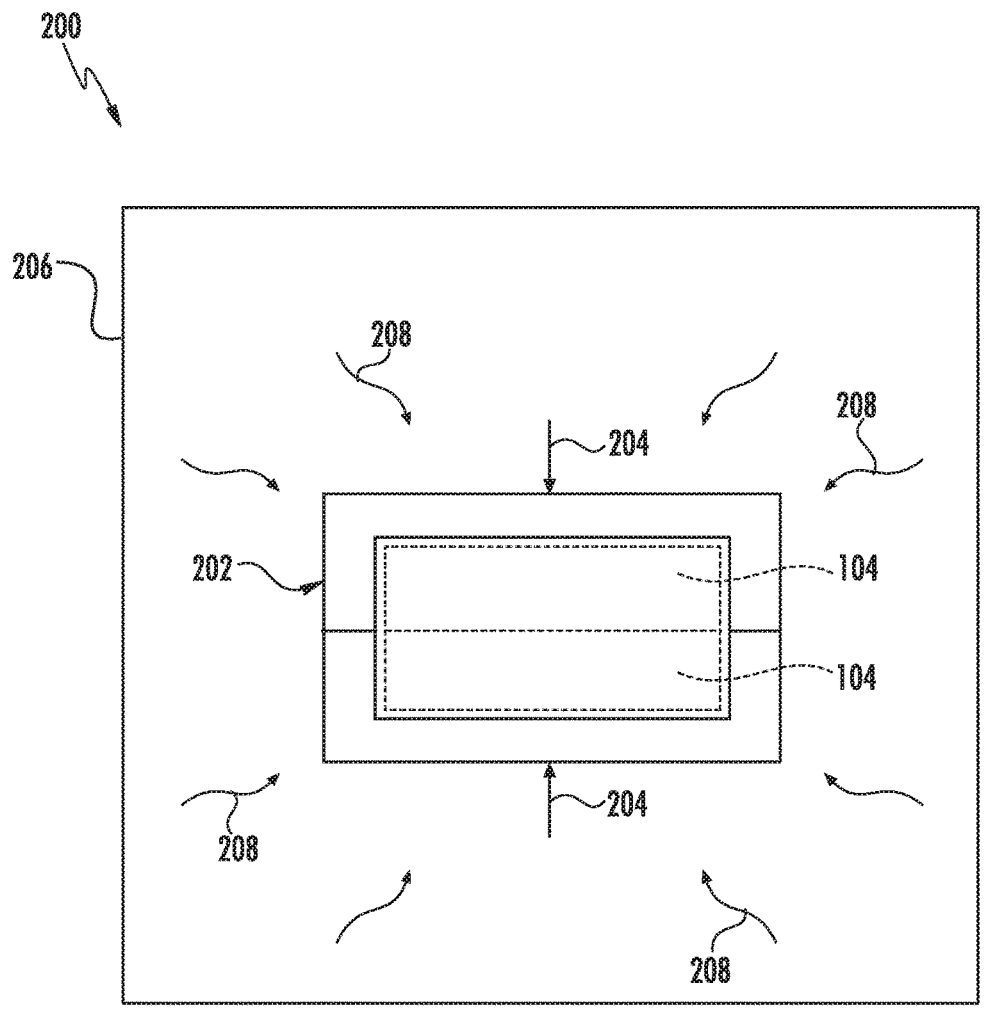
FIG. 4 illustrates a schematic view of one embodiment of a system for processing elastomeric load rings of face seals to provide improve load tolerance is illustrated in accordance with aspects of the present subject matter.

Referring now to FIG. 4, a schematic view of one embodiment of a system 200 for processing elastomeric load rings of face seals in a manner that provides for improved load tolerance is illustrated in accordance with aspects of the present subject matter. As shown in FIG. 4, the system 200 may generally include a fixture assembly 202 configured to receive one or more elastomeric load rings 104, either individually or assembled onto a corresponding sealing ring(s) 102. For example, as will be described below, in one embodiment, the fixture assembly 202 may be configured to receive one or more complete face seal sets 136. Alternatively, the fixture assembly 202 may only be configured to receive one or more elastomeric load rings 104 configured for use with face seals 100.

In several embodiments, the fixture assembly 202 may be configured to apply a compressive load (e.g., as indicated by arrows 204 in FIG. 4) through the elastomeric load ring(s) 104 contained within the fixture assembly 202. For example, as will be described below, the fixture assembly 202 may include first and second clamp members configured to be positioned relative to one another such that the elastomeric load ring(s) 104 are located directly between the clamp members. In such an embodiment, a compressive load 204 may be applied to one or both of the clamp members so that the load ring(s) 104 is compressed between the first and second clamp members.

Additionally, as shown in FIG. 4, the system 200 may also include a heating device 206 configured to heat the elastomeric load ring(s) 104 (e.g., as indicated by heat arrows 208 shown in FIG. 4) as the load ring(s) 104 is simultaneously being compressed within the fixture assembly 202. In several embodiments, the heating device 206 may correspond to an oven within which the fixture assembly 202 may be positioned. In such embodiments, the oven may be configured to be set to a predetermined temperature for heating the load ring(s) 104 contained within the fixture assembly 202. Alternatively, the heating device 206 may correspond to any other suitable device and/or component configured to allow the elastomeric material of the load ring(s) 104 to be heated to a desired temperature.

It should be appreciated that the specific temperature to which the elastomeric load ring(s) 104 is heated (as well as the time across which the load ring(s) 104 is maintained at such temperature) to produce the desired compression set may generally vary depending on the properties of the elastomeric material forming the load ring(s) 104 as well as on the initial/desired dimensions of the elastomeric load ring(s) 104. Given the material properties and/or the initial/desired dimensions of the elastomeric load ring(s) 104, one of ordinary skill in the art would be able to determine an appropriate temperature for inducing compression set in the load ring(s) 104.

By simultaneously compressing and heating the elastomeric load ring(s) 104 within the fixture assembly 202, a post-cure compression set may be produced in the load ring(s) 104 that provides for improved load tolerance for the face seal(s) 136 produced using the load ring(s) 104. For example, as will be described below, the compressive load applied via the fixture assembly 202 may correspond to the desired load for the face seal(s) 136 being manufactured. Additionally, as the heat causes compression set in the elastomeric material of the load ring(s) 104, the compressive load applied via the fixture assembly 202 may serve to force the load ring(s) 104 to the desired dimension (e.g., the desired axial width 142 (FIG. 3)). As such, the resulting elastomeric ring(s) 104 may exhibit the desired spring force while defining the desired dimension for application within a face seal(s) 136.

Figure 7:
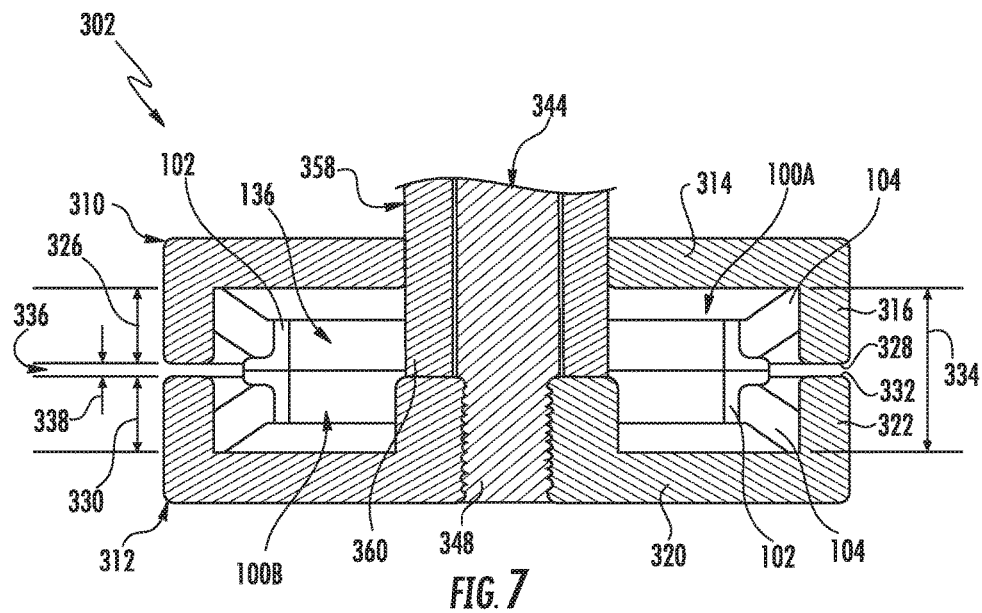
FIG. 7 illustrates a close-up, cross-sectional view of first and second clamp members of the fixture assembly shown in FIG. 5.
Figure 8:
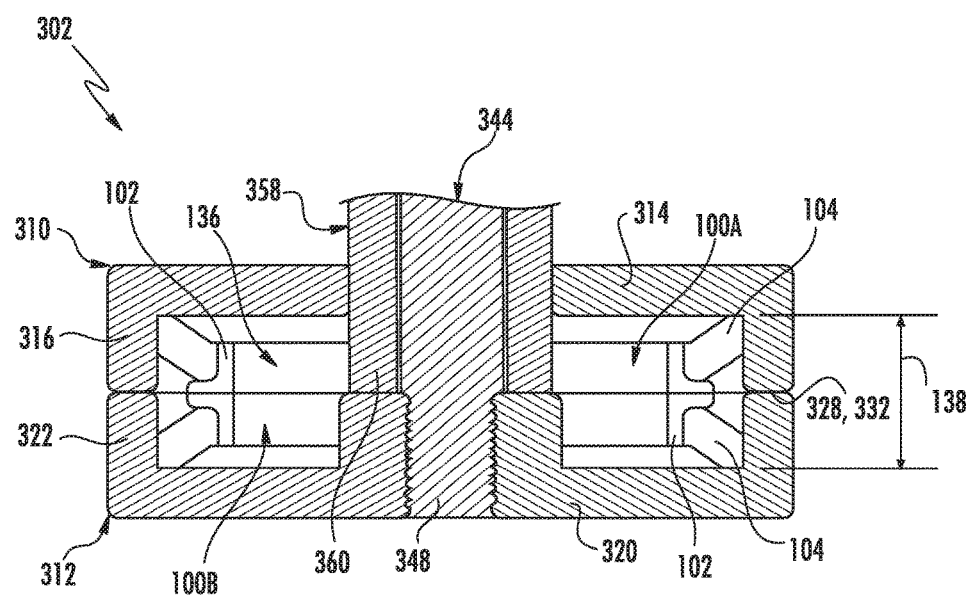
FIG. 8 illustrates a close-up, cross-sectional view of the first and second clamp members of the fixture assembly shown in FIG. 6.
Figure 9:
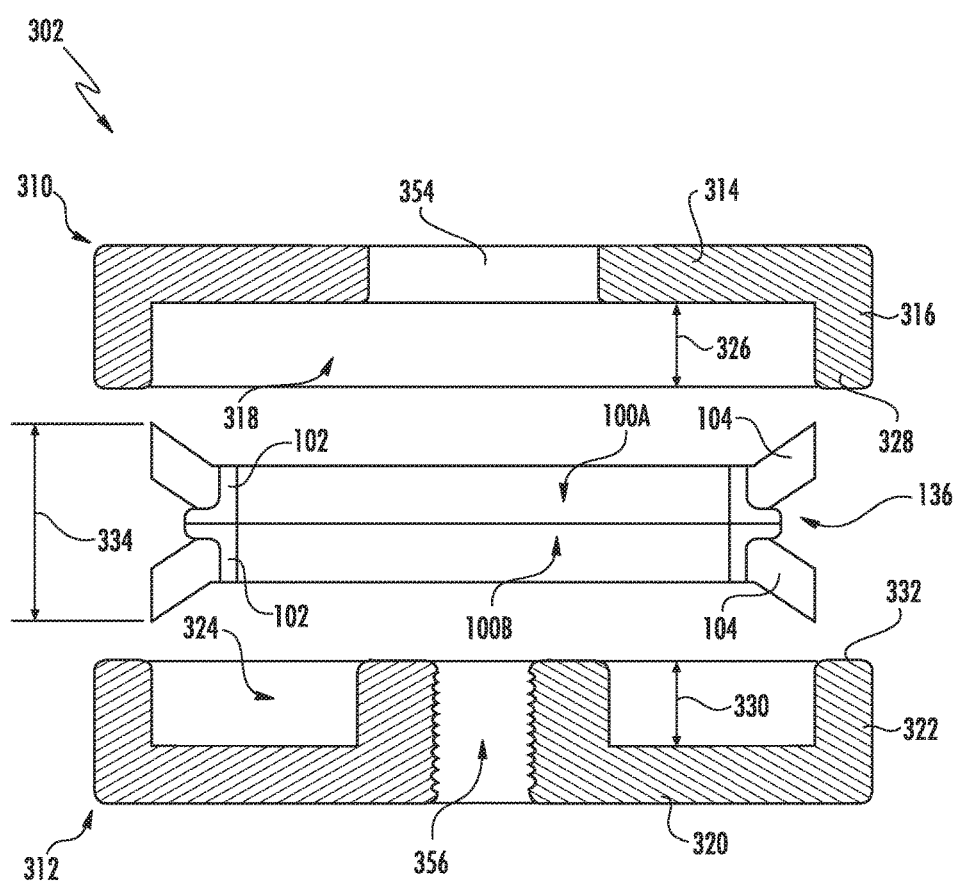
FIG. 9 illustrates a cross-sectional view of the first and second clamp members shown in FIGS. 7 and 8 exploded away from a face seal set configured to be installed between the clamp members.

Referring now to FIGS. 5-9, one embodiment of a fixture assembly 302 configured for use within the system 200 shown in FIG. 4 is illustrated in accordance with aspects of the present subject matter. Specifically, FIGS. 5 and 6 illustrate cross-sectional views of the fixture assembly 302 having a face seal set 136 contained therein, with FIG. 5 illustrating the fixture assembly 302 in an initial state prior to heating of the elastomeric load rings 104 and FIG. 6 illustrating the fixture assembly 302 in a final state after heating is completed to produce the compression set in the load rings 104. FIGS. 7 and 8 illustrate partial, cross-sectional views of the fixture assembly 302 shown in FIGS. 5 and 6, respectively, particularly illustrating first and second clamp members 310, 312 of the fixture assembly 302 in the initial state prior to heating (FIG. 7) and the clamp members 310, 312 in the final state after heating is completed (FIG. 8). Additionally, FIG. 9 illustrates an exploded view of the first and second clamp members 310, 312 shown in FIGS. 7 and 8 relative to the face seal set 136 installed within the fixture assembly 302.

In general, the fixture assembly 302 may include a first clamp member 310 and a second clamp member 312, with the first clamp member 310 configured to be positioned relative to the second clamp member 312 such that a face seal set 136 may be positioned between the clamp members 310, 312. As shown in FIGS. 7-9, the first clamp member 310 may include a first end wall 314 and a first sidewall 316 extending from the first end wall so as to define a first seal cup 318 (FIG. 9). Similarly, the second clamp member 312 may include a second end wall 320 and a second sidewall 322 extending from the second end wall 320 so as to define a second seal cup 324 (FIG. 9). As shown in the illustrated embodiment, the first and second seal cups 318, 324 may be configured to face one another when the first clamp member 310 is positioned relative to the second clamp member 310. As such, a first face seal 100A of the face seal set 136 may be at least partially received within the first seal cup 318 while a second face seal 100B of the face seal set 136 may be at least partially received within the second seal cup 324. For example, as shown in FIGS. 7 and 8, when the clamp members 310, 312 are installed relative to the face seal set 136, a portion of the elastomeric load ring 104 of the first face seal 100A may be configured to contact the first end wall 314 and/or the first sidewall 315 of the first clamp member 310. Similarly, a portion of the elastomeric load ring 104 of the second face seal 100B may be configured to contact the second end wall 320 and/or the second sidewall 322 of the second clamp member 312. As a result, the outer diameters of the elastomeric load rings 104 may be constrained within the fixture assembly 100 by the end walls 314, 320 and/or the sidewalls 316, 322 of the clamp members 310, 312 while the inner diameters of the load rings 104 may be constrained within the fixture assembly 302 by the metallic sealing rings 102 of the face seals 100A, 100B.

As particularly shown in FIG. 9, the first seal cup 318 may define a first depth 326 extending from an inner side of the first end wall 314 to an outer end 320 of the first sidewall 316. Additionally, the second seal cup 324 may define a second depth 330 extending from an inner side of the second end wall 320 to an outer end 332 of the second sidewall 322. In several embodiments, the summation of the first and second depths 326, 330 of the seal cups 318, 324 may be less than an initial width 334 (FIGS. 5 and 7) of the face seal set 136 as installed within the fixture assembly 302 (i.e., the width of the face seal set 136 within the fixture assembly 302 prior to compression setting the elastomeric load rings 104). For example, as particularly shown in FIG. 7, when the face seal set 136 is installed between the clamp members 310, 312, a gap 336 may be defined between the adjacent outer ends 328, 332 of the first and second sidewalls 316, 322 that spans a height 338 corresponding to the difference between the initial width 334 of the face seal set 136 and the summation of the depths 326, 330 of the seal cups 318, 324. As will be described below, in several embodiments, the summation of the depths 326, 330 of the seal cups 318, 324 may correspond to the desired operating width 138 for the face seal set 136. Thus, as the initial width 334 of the face seal set 136 is reduced during compression setting of the elastomeric load rings 104, the height 338 of the gap 336 between the outer ends 328, 332 of the sidewalls 316, 322 may be reduced until the outer end 238 of the first sidewall 316 contacts the outer end 332 of the second sidewall 322, thereby indicating that the width of the face seal set 136 has been reduced to the desired operating width 138 (e.g., as shown in FIGS. 6 and 8).

Additionally, as shown in FIGS. 5 and 6, the fixture assembly 302 may include a load member 340 configured to apply a compressive load to the first clamp member 310 and/or the second clamp member 312 such that the face seal set 136 may be compressed between the clamp members 310, 312 as the assemblage is being heated. In several embodiments, the load member may correspond to a spring 340. For instance, in the illustrated embodiment, the spring 340 corresponds to a coil spring. Alternatively, the spring 340 may correspond to any other suitable type of spring, such as a spring washer (also referred to as a disc spring or Belleville washer). In accordance with aspects of the present subject matter, the compressive load applied by the spring 340 may correspond to the desired load for the resulting elastomeric load rings 104. Thus, it should be appreciated that a spring constant for the spring 340 may be selected based on the anticipated displacement of the spring 340 within the fixture assembly 302 such that the spring 340 applies a compressive load corresponding to the desired spring load for the elastomeric load rings 104.

It should also be appreciated that, as an alternative to the spring 340, the fixture assembly 302 may include any other suitable load member configured to apply a compressive load to one or both of the first and second clamp members 310, 312. For example, in another embodiment, one or more cylinders (e.g., pneumatic or hydraulic cylinders) may be coupled to the first clamp member 301 and/or the second clamp member 312 so as to apply a compressive load that allows the face seal set 136 to be compressed between the clamp members 310, 312.

As shown in FIGS. 5 and 6, the spring 340 may be positioned directly between the first clamp member 310 and a retention plate 342 spaced apart from the first clamp member 310. In several embodiments, the retention plate 342 may be coupled to the second clamp member 312 such that the retention plate 342 is retained in a fixed position relative to the second clamp member 312, thereby resulting in the load applied by the spring 340 being transmitted through both clamp members 310, 312. For example, as shown in FIGS. 5 and 6, the fixture assembly 302 may include a retention bolt 344 extending lengthwise between a first end 346 and a second end 348, with the first end 346 being coupled to the retention plate 342 (e.g., via a washer 350) and the second end 348 being coupled to the second clamp member 312. Specifically, as shown in the illustrated embodiment, the retention bolt 344 may be slidably inserted through both an opening 352 defined in the retention plate 342 and an opening 354 (FIG. 9) defined in the first clamp member 310 and subsequently screwed into a threaded opening 356 (FIG. 9) defined in the second clamp member 312. Additionally, as shown in FIGS. 5 and 6, the fixture assembly 302 may include a rigid collar surrounding the retention bolt 344 that extends directly between the second clamp member 310 and the retention plate 342, thereby allowing a fixed distance to be set between such components. Similar to the retention bolt 344, the rigid collar 358 may be slidably received through the opening 354 defined in the first clamp plate 310 such that the first clamp plate 310 is allowed to move relative to the collar 358. Thus, with a bottom end 360 of the rigid collar 358 supported on the second clamp member 312, the retention bolt 344 may be screwed into the threaded opening 356 defined in the second clamp member 312 until the retention plate 342 contacts a top end 362 of the rigid collar 358, thereby coupling the retention plate 342 to the second clamp member 312 in a manner that allows the compressive load applied by the spring 340 to be transmitted through the clamp members 310, 312 to the face seal set 136. As a result, when the assemblage is subsequently heated and the initial width 334 of the face seal set 136 is reduced due to the compression set in the elastomeric material of the load rings 104, the first clamp member 310 may move relative to the collar 358 in the direction of the second clamp member 312 to reduce the height 338 of the gap 336 defined between the clamp members 310, 312 until the first sidewall 316 contacts the second sidewall 322.

It should be appreciated that, when the face seal set 136 is initially installed within the fixture assembly 302, the outward spring force provided by the elastomeric load rings 104 against the clamp members 310, 312 may exceed the compressive load applied by the spring 340, thereby preventing the spring 340 from compressing the clamp members 310, 312 together (and, thus, resulting in the gap 336 between the clamp members 310, 312). However, as indicated above, the combination of the heat provided by the heating device 206 and the compressive load applied by the spring 340 may produce compression set in the elastomeric load rings 104. As a result, the reactive spring force of the elastomeric rings 104 may be reduced until the spring force is equal to the compressive load applied by the spring 340. Additionally, the spring 340 may compress the clamp members 310, 312 together such that the width of the face seal set 136 is reduced to the desired seal width 138 (e.g., the summation of the depths 326, 330 of the first second seal cups 318, 324). At such point, the first sidewall 316 of the first clamp member 310 may contact the second sidewall 322 of the second clamp member 312, thereby preventing further compression of the face seal set 136. The face seal set 136 may then be removed from the fixture assembly 302 and replaced with another face seal set 136, with the process being repeated for the new face seal set 136.

Figure 10:
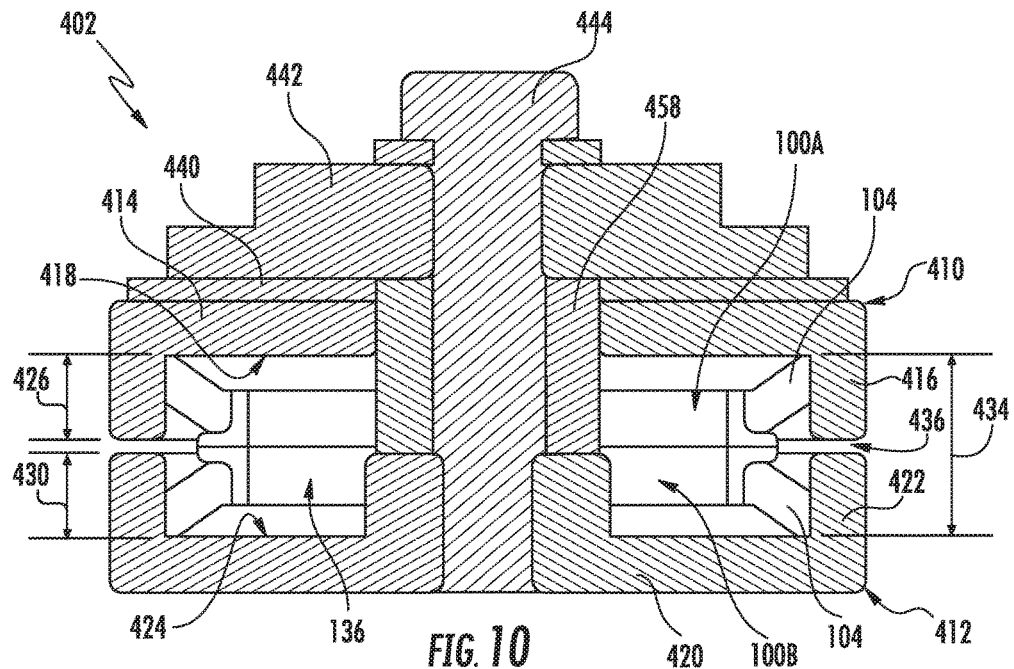
FIG. 10 illustrates a cross-sectional view of another embodiment of a fixture assembly suitable for use within the system shown in FIG. 4, particularly illustrating the fixture assembly in an initial state prior to heating of the elastomeric load rings contained within the fixture assembly.
Figure 11:
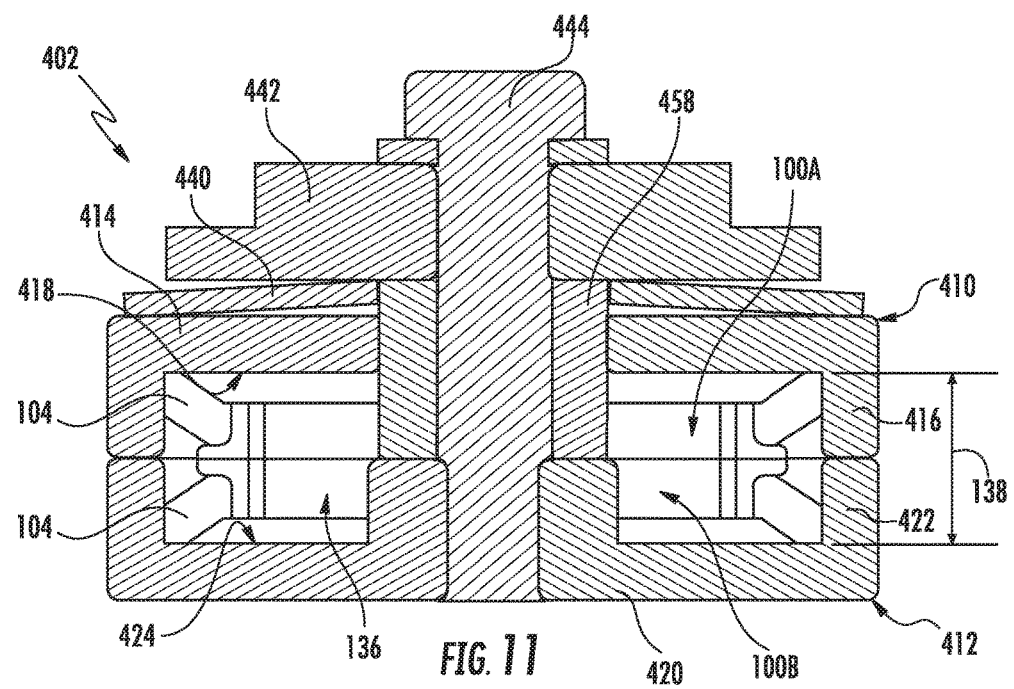
FIG. 11 illustrates another cross-sectional view of the fixture assembly shown in FIG. 10, particularly illustrating the fixture assembly in a final state after heating is completed to produce the compression set in the load rings contained within the fixture assembly.

Referring now to FIGS. 10 and 11, another embodiment of a fixture assembly 402 configured for use within the system 200 shown in FIG. 4 is illustrated in accordance with aspects of the present subject matter. Specifically, FIG. 10 illustrates a cross-sectional view of the fixture assembly 402 having a face seal set 136 contained therein, particularly illustrating the fixture assembly 402 in an initial state prior to heating the elastomeric load rings 104. Additionally, FIG. 11 illustrates another across-sectional view of the fixture assembly 402 shown in FIG. 10, particularly illustrating the fixture assembly 402 in a final state after heating is completed to produce the compression set in the load rings 104.

In general, the fixture assembly 402 may be configured the same as or similar to the fixture assembly 302 described above with reference to FIGS. 5-9. For example, as shown in FIGS. 10 and 11, the fixture assembly 402 may include a first clamp member 410 and a second clamp member 412, with the first clamp member 410 including a first end wall 414 and a first sidewall 416 extending from the first end wall 414 so as to define a first seal cup 418 for at least partially receiving a first face seal 100A of the face seal set 136 and the second clamp member 412 including a second end wall 420 and a second sidewall 422 extending from the second end wall 420 so as to define a second seal cup 424 for at least partially receiving a second face seal 100B of the face seal set 136. As particularly shown in FIG. 10, the first seal cup 418 may define a first depth 426 while the second seal cup 424 may define a second depth 430. As indicated above, the summation of the first and second depths 426, 430 may, for example, correspond to the desired operating width 138 (FIG. 11) for the face seal set 136.

Additionally, the fixture assembly 402 may include a load member 440 positioned between the first clamp member 410 and a retention plate 442 spaced apart from the first clamp member 410. As indicated above, in several embodiments, the load member 440 may correspond to a spring 440. However, unlike the embodiment shown in FIGS. 5-9, the spring 440 corresponds to a spring washer (also referred to as a disc spring or Belleville washer). As such, when compressions set is produced in the elastomeric load rings 103, the spring 440 may transition from a generally planar state to an expanded state as the spring 440 compresses the clamp members 410, 412 together.

Moreover, as shown in FIGS. 10 and 11, the retention plate 442 may be coupled to the second clamp member 412 via a retention bolt 444 extending through both the retention plate 442 and the first clamp member 410. In addition, a rigid collar 458 may be provided directly between the retention plate 442 and the second clamp member 412. Thus, when the retention bolt 444 is tightened down, the retention plate 442 may be maintained in a fixed position relative to the second clamp member 412. As such, when the spring 440 moves to its expanded state with compression set of the elastomeric load rings 104, the first clamp member 410 may move relative to the collar 458 in the direction of the second clamp member 412 until the first sidewall 416 contacts the second sidewall 422.

Similar to the embodiment described above, when the face seal set 136 is initially installed within the fixture assembly 402, the outward spring force provided by the elastomeric load rings 104 against the clamp members 410, 412 may exceed the compressive load applied by the spring 340, thereby preventing the spring 340 from compressing the clamp members 410, 412 together (and, thus, resulting in a gap 436 (FIG. 10) between the clamp members 410, 412). However, as indicated above, the combination of the heat provided by the heating device 206 and the compressive load applied by the spring 440 may produce compression set in the elastomeric load rings 104. As a result, the reactive spring force of the elastomeric rings 104 may be reduced until the spring force is equal to the compressive load applied by the spring 440. Additionally, the spring 440 may compress the clamp members 410, 412 together such that the width of the face seal set 136 is reduced from an initial width 434 (FIG. 10) to the desired width (FIG. 11) (e.g., the summation of the depths 426, 430 of the first second seal cups 418, 424). At such point, the first sidewall 416 of the first clamp member 410 may contact the second sidewall 422 of the second clamp member 412, thereby preventing further compression of the face seal set 136. The face seal set 136 may then be removed from the fixture assembly 402 and replaced with another face seal set 136, with the process being repeated for the new face seal set 136.

It should be appreciated that, although the fixture assemblies 302, 402 shown in FIGS. 5-11 have generally been illustrated as being designed to accommodate a single face seal set 136, the fixture assemblies 302, 403 may, instead, be configured to accommodate multiple face seal sets 136, thereby allowing any number of face seal sets 136 to be processed simultaneously. For example, FIGS. 12 and 13 illustrate the fixture assembly 402 shown in FIGS. 10 and 11 reconfigured to accommodate a plurality of face seal sets 136. Specifically, FIG. 12 illustrates a cross-sectional view of the fixture assembly 402 in an initial state prior to heating the elastomeric load rings 104. Additionally, FIG. 13 illustrates the fixture assembly 402 in a final state after heating is completed to produce the compression set in the load rings 104.

As shown in FIGS. 12 and 13, as opposed to including a single pair of clamp members, the fixture assembly includes a plurality of pairs of clamp members stacked one on top of another, with each pair of clamp members including a first clamp member 410 and a second clamp member 412. In such an embodiment, a different face seal set 136 may be installed between each pair of clamp members 410, 412. In the illustrated embodiment, the fixture assembly 402 includes three pairs of clamp members 410, 412, thereby allowing the assembly 402 to accommodate three face seal sets 136. However, in other embodiments, the fixture assembly 402 may include any other suitable number of pairs of clamp members 410, 412.

To accommodate the multiple pairs of clamp members 410, 412, the retention bolt 444 and the rigid collar 458 may be lengthened from the configuration shown in FIGS. 10 and 11 such that the bolt/collar 444, 458 define sufficient lengths for extending between the retention plate 442 and the bottom clamp member of the assembly 402 (indicated in FIGS. 10 and 11 as clamp member 412A). As such, the retention bolt 444 may be coupled to the bottom clamp member 412A to allow the assembly 402 be tightened down so that the rigid collar 458 contacts both the retention plate 442 and the bottom clamp member 412A, thereby setting a fixed distance between such components. Additionally, as shown in FIGS. 11 and 12, the retention bolt 444 and the rigid collar 458 may be slidably received through the remainder of the clamp members 410, 412 (i.e., all of the clamp members 410, 412 less than the bottom clamp member 412A) to allow such clamp members 410, 412 to move relative to the bolt/collar 444, 458. Thus, as the elastomeric load rings 104 are heated to produce compression set in the elastomeric material, the compressive load applied by the spring 440 may cause the elastomeric load rings 104 of each face seal set 136 to be compressed between its respective pair of clamp members 410, 412 until the clamp members 410, 412 contact one another, thereby setting the final width/load for the face seal sets 136.

Figure 14:
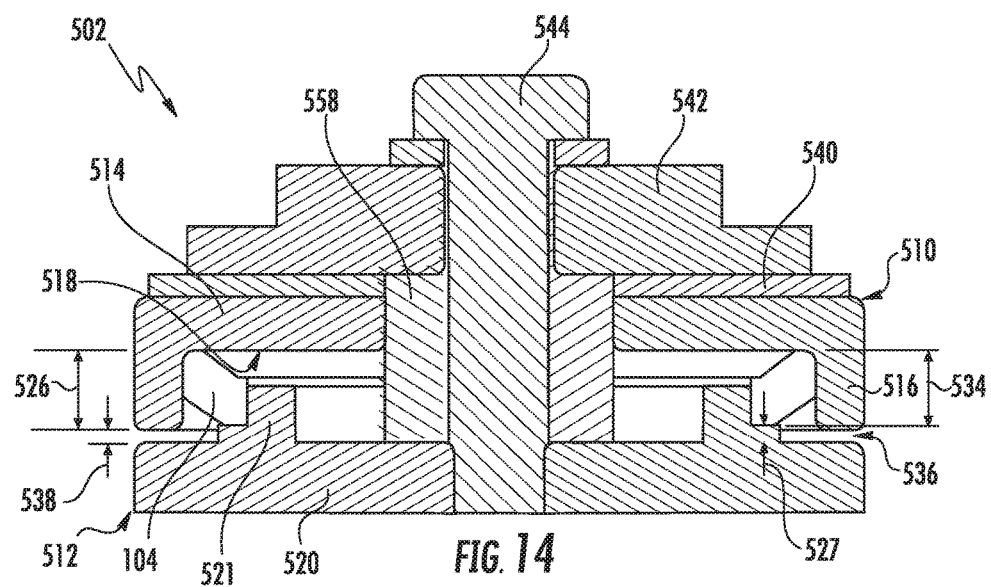
FIG. 14 illustrates a cross-sectional view of yet another embodiment of a fixture assembly suitable for use within the system shown in FIG. 4, particularly illustrating the fixture assembly in an initial state prior to heating of the elastomeric load ring contained within the fixture assembly.
Figure 15:
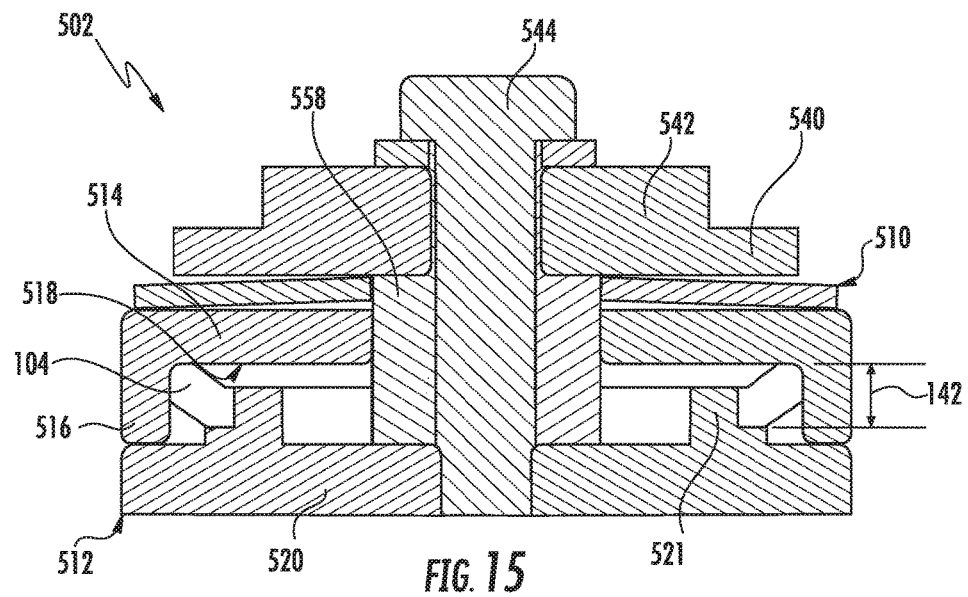
FIG. 15 illustrates another cross-sectional view of the fixture assembly shown in FIG. 14, particularly illustrating the fixture assembly in a final state after heating is completed to produce the compression set in the load ring contained within the fixture assembly.

Referring now to FIGS. 14 and 15, a further embodiment of a fixture assembly 502 configured for use within the system 200 shown in FIG. 4 is illustrated in accordance with aspects of the present subject matter. Specifically, FIG. 14 illustrates a cross-sectional view of the fixture assembly 502 having an elastomeric load ring 104 contained therein, particularly illustrating the fixture assembly 402 in an initial state prior to heating the load ring 104. Additionally, FIG. 15 illustrates another across-sectional view of the fixture assembly 502 shown in FIG. 14, particularly illustrating the fixture assembly 502 in a final state after heating is completed to produce the compression set in the load ring 104.

As shown in FIGS. 14 and 15, unlike the embodiments described above, the fixture assembly 502 is configured to accommodate an elastomeric load ring 104 as opposed to an entire face seal set 136. In such an embodiment, one or both of the clamp members 510, 512 may be reconfigured to allow the elastomeric load ring 104 to be properly supported between the clamp members 510, 512. Specifically, in the illustrated embodiment, the fixture assembly 502 includes a first clamp member 510 and a second clamp member 512, with the first clamp member 510 generally being configured similar to the clamp members 310, 410 described above. For example, the first clamp member 510 includes a first end wall 514 and a first sidewall 516 extending from the first end wall 514 so as to define a first seal cup 518 for at least partially receiving the elastomeric load ring 104. In such an embodiment, an outer portion of the elastomeric load ring 104 may be configured to contact the first end wall 514 and/or the first sidewall 516 of the first clamp member 510, thereby allowing the outer diameter of the elastomeric load ring 104 to be constrained within the fixture assembly 502.

Additionally, as shown in the illustrated embodiment, the second clamp member 512 may include a second end wall 520 and an annular projection 521 extending outwardly from the second end wall 520 in the direction of the first clamp member 510. As particularly shown in FIGS. 14 and 15, the annular projection 521 may be configured to support an inner portion of the elastomeric load ring 104 relative to the second end wall 520, thereby allowing the inner diameter of the load ring 104 to be constrained within the fixture assembly 502. For example, in one embodiment, the annular projection 521 may define an "L-shaped" cross-sectional profile generally corresponding to the "L-shaped" cross-sectional profile of the sealing ring 102 onto which the elastomeric load ring 104 is configured to be installed. As such, the annular projection 521 may serve to provide the same or a similar radial constraint to the elastomeric load ring 104 as its corresponding sealing ring 102.

As shown particularly shown in FIG. 14, a depth 526 of the seal cup 518 and/or a height 527 of the annular projection 521 may be selected such that, when the elastomeric load ring 104 is initially installed within the fixture assembly 502, a gap 536 is defined between the outer end of the first sidewall 516 and the second clamp member 512. In such an embodiment, a height 538 of the gap 536 may correspond to a difference between an initial width 534 of the elastomeric load ring 104 (FIG. 14) and a desired axial width 142 of the elastomeric load ring 104 (FIG. 15). Thus, as the initial width 524 of the elastomer load ring 104 is reduced during compression setting thereof, the height 538 of the gap 536 may be reduced until the first sidewall 516 contacts the second clamp member 512, thereby indicating that the width of the load ring 104 has been reduced to the desired axial width 142.

Additionally, the fixture assembly 502 may also include a load member 540 (e.g., a spring 540, such as a spring washer) positioned between the first clamp member 510 and a retention plate 542 spaced apart from the first clamp member 510. Similar to the embodiments described above, the retention plate 542 may be coupled to the second clamp member 512 via a retention bolt 544 extending through both the retention plate 542 and the first clamp member 510. Moreover, a rigid collar 558 may be provided directly between the retention plate 542 and the second clamp member 512. Thus, when the retention bolt 544 is tightened down, the retention plate 542 may be maintained in a fixed position relative to the second clamp member 512. As such, when the spring 540 moves to its expanded state with compression set of the elastomeric load ring 104, the first clamp member 510 may move relative to the collar 558 in the direction of the second clamp member 512 until the first sidewall 516 contacts the second clamp member 512.

Similar to the embodiments described above, when the elastomeric load ring 104 is initially installed within the fixture assembly 502, the outward spring force provided by the load ring 104 against the clamp members 510, 512 may exceed the compressive load applied by the spring 540, thereby preventing the spring 540 from compressing the clamp members 510, 512 together (and, thus, resulting in the gap 536 between the clamp members 510, 512). However, as indicated above, the combination of the heat provided by the heating device 206 and the compressive load applied by the spring 540 may produce compression set in the elastomeric load ring 104. As a result, the reactive spring force of the elastomeric load ring 104 may be reduced until the spring force is equal to the compressive load applied by the spring 540. Additionally, the spring 540 may compress the clamp members 510, 512 together such that the width of the elastomeric load ring 104 is reduced from its initial width 534 to the desired axial width 142. At such point, the first sidewall 516 of the first clamp member 510 may contact the second clamp member 512, thereby preventing further compression of the elastomeric load ring 104. The load ring 104 may then be removed from the fixture assembly 502 and replaced with another elastomeric load ring 104, with the process being repeated for the new load ring 104.

It should be appreciated that, although the fixture assembly 502 shown in FIGS. 14 and 15 is illustrated as being designed to accommodate a single elastomeric load ring 104, the fixture assembly 502 may, instead, be configured to accommodate multiple elastomeric load rings 104, thereby allowing any number of load rings 104 to be processed simultaneously. For example, FIGS. 16 and 17 illustrate the fixture assembly 502 shown in FIGS. 10 and 11 reconfigured to accommodate a plurality of elastomeric load rings 104. Specifically, FIG. 16 illustrates a cross-sectional view of the fixture assembly 502 in an initial state prior to heating the elastomeric load rings 104. Additionally, FIG. 17 illustrates the fixture assembly 502 in a final state after heating is completed to produce the compression set in the load rings 104.

As shown in FIGS. 16 and 17, as opposed to including only two clamp members 510, 512, the fixture assembly includes a plurality of clamp members 510, 512, 513 stacked one on top of another, with each adjacent pair of clamp members 510, 512, 513 being configured to receive an elastomeric load ring 104 therebetween. Specifically, in the illustrated embodiment, the fixture assembly 502 includes seven clamp members 510, 512, 513, thereby allowing the assembly 502 to accommodate six elastomeric load rings 104. However, in other embodiments, the fixture assembly 502 may include any other suitable number of clamp members 510, 512, 513 configured to accommodate a corresponding number of elastomeric load rings 104.

As shown in the illustrated embodiment, the fixture assembly 502 includes top clamp member 510, a bottom clamp member 512 and a plurality of intermediate clamp members 513 stacked between the top and bottom clamp members 510, 512. The top and bottom clamp members 510, 512 of the fixture assembly 500 may generally be configured the same as the first and second clamp members 510, 512 described above with reference to FIGS. 14 and 15, respectively. For example, the top clamp member 510 may include an end wall 514 and a sidewall 516 extending outwardly from the end wall 514 so as to define a seal cup 518 for at least partially receiving the adjacent elastomeric load ring 104. Similarly, the bottom clamp member 512 may include an end wall 520 and an annular projection 521 extending outwardly from the end wall 520 to allow an adjacent elastomeric load ring 104 to be support thereon. Additionally, as shown in FIGS. 16 and 17, the intermediate clamp members 513 include the features of both the top clamp member 510 and the bottom clamp member 512. For example, each intermediate clamp member 513 may include an end wall 514 A having an annular projection 521 A extending upwardly along a top side of the end wall 514A and a sidewall 516A extending downwardly along a bottom side of the end wall 514A so as to define a corresponding seal cup 518A. As such, an elastomeric load ring 104 positioned along the top side of a given intermediate clamp member 513 may be compressed between the annular projection 521A of the clamp member 513 and the seal cup 518, 518A defined by the clamp member 510, 513 positioned immediately above such clamp member 513 while an elastomeric load ring 104 positioned along the bottom side of the intermediate clamp member 513 may be compressed between the seal cup 518A defined by the clamp member 513 and the annular projection 521, 521A of the clamp member 512, 513 positioned immediately below the clamp member 513.

To accommodate the plurality of clamp members 510, 512, 513, the retention bolt 544 and the rigid collar 558 may be lengthened from the configuration shown in FIGS. 14 and 15 such that the bolt/collar 544, 558 define sufficient lengths for extending between the retention plate 542 and the bottom clamp member 512 of the assembly 502. As such, the retention bolt 544 may be coupled to the bottom clamp member 512 to allow the assembly 502 be tightened down so that the rigid collar 558 contacts both the retention plate 542 and the bottom clamp member 512, thereby setting a fixed distance between such components. Additionally, as shown in FIGS. 16 and 17, the retention bolt 544 and the rigid collar 558 may be slidably received through the remainder of the clamp members 510, 513 (i.e., all of the clamp members 510, 513 less than the bottom clamp member 512) to allow such clamp members 510, 513 to move relative to the bolt/collar 544, 558. Thus, as the elastomeric load rings 104 are heated to produce compression in the elastomeric material, the compressive load applied by the spring 540 may cause each elastomeric load rings 104 to be compressed between its adjacent clamp members 510, 512, 513 until the sidewall 516, 516A of the upper clamp member 510, 513 contacts the adjacent load clamp member 512, 513, thereby setting the final width/load for the load rings 104.

Figure 18:
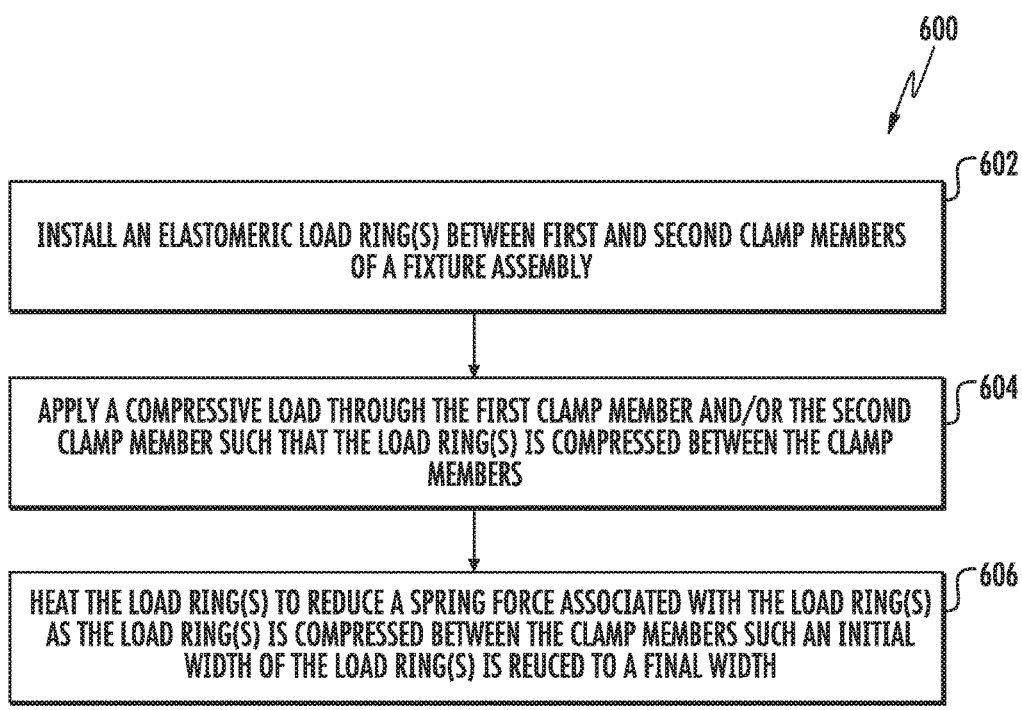
FIG. 18 illustrates a flow diagram of one embodiment of a method for processing elastomeric load rings of face seals to provide improve load tolerance is illustrated in accordance with aspects of the present subject matter.

Referring now to FIG. 18, a flow diagram of one embodiment of a method 600 for processing an elastomeric load ring(s) of a face seal(s) is illustrated in accordance with aspects of the present subject matter. In general, the method 600 will be described herein with reference to the system 200 shown in FIG. 4 as well as the embodiments of the fixture assemblies 302, 402, 502 shown in FIGS. 5-17. However, it should be appreciated by those of ordinary skill in the art that the disclosed method 600 may also be implemented with any other fixture assembly configuration and/or as part of any other suitable system. In addition, although FIG. 18 depicts steps performed in a particular order for purposes of illustration and discussion, the methods described herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 18, at (602), the method 600 may include installing an elastomeric load ring(s) between first and second clamp members of a fixture assembly. As indicated above, one or more elastomeric load rings 104 may be installed within the fixture assembly 302, 402, 502 individually or as part of one or more assembled face seal sets 136.

Additionally, at (604), the method 600 may include applying a compressive load through at least one of the first clamp member or the second clamp member such that the elastomeric load ring(s) is compressed between the first and second clamp members. For example, as indicated above, the fixture assembly 302, 402, 502 may include a load member 340, 440, 540, such as a coil spring or a spring washer, configured to apply a compressive load through the clamp members 310, 312, 410, 412, 412A, 510, 512, 513. As such, when the elastomeric load ring(s) 104 is installed within the fixture assembly 302, 402, 502, the load ring(s) 104 may be compressed between the clamp members 310, 312, 410, 412, 412A, 510, 512, 513.

Moreover, at (606), the method 600 may include heating the elastomeric load ring(s) to reduce a spring force associated with the load ring(s) as the load ring(s) is compressed between the first and second clamp members such that an initial width of the elastomeric load ring(s) is reduced to a final width. Specifically, as indicated above, by simultaneously heating and compressing the elastomeric load ring(s) 104, compression set may be induced within the elastomeric material of the load ring(s) 104, thereby causing the width of the load ring(s) 104 to be reduced as the spring force associated with the load ring(s) 104 is reduced relative to the compressive load applied via the spring 340, 440, 540. In such an embodiment, the elastomeric load ring(s) 104 may be heated until the adjacent clamp members 310, 312, 410, 412, 412A, 510, 512, 513 contact one another, thereby indicating that the desired force/width for the elastomeric load ring(s) 104 has been set.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for processing elastomeric load rings of face seals, the system comprising:
    an elastomeric load ring configured for use with a face seal, the elastomeric load ring defining an initial width;
    a fixture assembly configured to receive the elastomeric load ring, the fixture assembly comprising:
        a first clamp member;
        a second clamp member positioned relative to the first clamp member such that the elastomeric load ring is positioned between the first and second clamp members, the second clamp member being spaced apart from the first clamp member such that a gap is defined between the first and second clamp members when the elastomeric load ring defines the initial width; and
        a load member configured to apply a compressive load through at least one of the first clamp member or the second clamp member such that the elastomeric load ring is compressed between the first and second clamp members; and
    a heating device configured to heat the elastomeric load ring;
    wherein, when the elastomeric load ring is heated by the heating device, a spring force associated with the elastomeric load ring is reduced as the elastomeric load ring is compressed between the first and second clamp members such that the initial width of the elastomeric load ring is reduced to a final width,
    wherein the first clamp member contacts the second clamp member when the elastomeric load ring defines the final width.

2. The system of claim 1, wherein the elastomeric load ring corresponds to a first elastomeric load ring of a face seal set, the face seal set including a first face seal and a second face seal, the first face seal including a first sealing ring and the first elastomeric load ring, the second face seal including a second sealing ring and a second elastomeric load ring, the first and second face seals collectively defining an initial seal width of the face seal set, the load member being configured to apply the compressive load through the at least of the first clamp member or the second clamp member such that the first and second face seals are compressed between the first and second clamp members.

3. The system of claim 2, wherein the first clamp member includes a first end wall and a first sidewall extending from the first end wall so as to define a first seal cup having a first depth, the first face seal being at least partially received within the first seal cup, the second clamp member including a second end wall and a second sidewall extending from the second end wall so as to define a second seal cup having a second depth, the second face seal being at least partially received within the second seal cup, the first and second clamp members being positioned relative to one another such that the first and second seal cups face one another.

4. The system of claim 3, wherein the initial seal width of the face seal set is greater than a summation of the first and second depths, wherein, when the fixture assembly is heated by the heating device, a spring force associated with the first and second elastomeric rings is reduced as the first and second face seals are compressed between the first and second clamp members such that the initial seal width of the face seal set is reduced to a final seal width corresponding to the summation of the first and second depths.

5. The system of claim 3, wherein the first face seal is received within the first seal cup such that an outer portion of the first elastomeric ring contacts at least one of the first end wall or the first sidewall of the first seal cup and wherein the second face seal is received within the second seal cup such that an outer portion of the second elastomeric ring contacts at least one of the second end wall or the second sidewall of the second seal cup.

6. The system of claim 3, wherein an outer end of the first sidewall contacts an outer end of the second sidewall when the initial seal width has been reduced to the final seal width.

7. The system of claim 3, wherein the gap defines a height when the face seal set is initially installed within the fixture assembly corresponding to a difference between the initial seal width and the summation of the first and second depths.

8. The system of claim 1, wherein the load member comprises a spring compressed between the first clamp member and a retention plate spaced apart from the first clamp member.

9. The system of claim 8, wherein the retention plate is coupled to the second clamp member such that the retention plate is maintained at a fixed distance from the second clamp member as the initial width of the elastomeric load ring is reduced to the final width.

10. The system of claim 9, further comprising a retention bolt extending between a first end coupled to the retention plate and a second end coupled to the second clamp member.

11. The system of claim 10, wherein the retention bolt extends through an opening defined in the first clamp member such that the first clamp member is movable relative to the retention bolt.

12. The system of claim 11, further comprising a rigid collar extending directly between the retention plate and the second clamp member, the rigid collar extending through the opening defined in the first clamp member.

13. The system of claim 8, wherein the spring comprises a coil spring or a spring washer.

14. The system of claim 1, wherein the compressive load applied by the load member corresponds to a desired spring force for the elastomeric load ring.

15. The system of claim 1, wherein the first and second clamp members form a pair of clamp members, the fixture assembly comprising a plurality of pairs of clamp members stacked one on top of another, each pair of clamp members being configured to receive at least one elastomeric load ring.

16. The system of claim 1, wherein the first clamp member includes a first end wall and a first sidewall extending from the first end wall so as to define a first seal cup, the elastomeric load ring being at least partially received within the first seal cup such that an outer portion of the elastomeric load ring contacts at least one of the end wall or the sidewall, the second clamp member including an annular projection extending outwardly in the direction of the first clamp member, the second clamp member being positioned relative to the first clamp member such that an inner portion of the elastomeric load ring is supported on the annular projection.

17. The system of claim 16, wherein the first clamp member corresponds to a top clamp member of the fixture assembly and the second clamp member corresponds to a bottom clamp member of the fixture assembly, further comprising a plurality of intermediate clamp members stacked between the top and bottom clamp members.

18. The system of claim 17, wherein each intermediate clamp member includes an end wall having an annular projection extending outwardly from a top side of the end wall and a sidewall extending outwardly from a bottom side of the end wall, each intermediate clamp member configured to be positioned between separate elastomeric load rings installed within the fixture assembly.

19. The system of claim 1, wherein the gap defines a height when the elastomeric load is initially installed within the fixture assembly corresponding to a difference between the initial width and the final width.

20. The system of claim 1, wherein the heating device corresponds to an oven configured to receive the fixture assembly and the elastomeric load ring.

* * * * *